(12) United States Patent
Shao et al.

(10) Patent No.: US 8,679,704 B2
(45) Date of Patent: Mar. 25, 2014

(54) CARBIDE STABILIZED CATALYST STRUCTURES AND METHOD OF MAKING

(75) Inventors: Minhua Shao, Manchester, CT (US); Belabbes Merzougui, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 154 days.

(21) Appl. No.: 13/320,313

(22) PCT Filed: May 14, 2009

(86) PCT No.: PCT/US2009/002985
§ 371 (c)(1),
(2), (4) Date: Nov. 14, 2011

(87) PCT Pub. No.: WO2010/132041
PCT Pub. Date: Nov. 18, 2010

(65) Prior Publication Data
US 2012/0058417 A1    Mar. 8, 2012

(51) Int. Cl.
*H01M 4/90* (2006.01)
*H01M 4/88* (2006.01)
*B01J 23/38* (2006.01)

(52) U.S. Cl.
USPC ............ 429/524; 429/525; 977/755; 977/773

(58) Field of Classification Search
USPC .................. 429/524, 525; 977/755, 773, 901
See application file for complete search history.

(56) References Cited

U.S. PATENT DOCUMENTS

| | | |
|---|---|---|
| 2005/0282061 A1 | 12/2005 | Campbell |
| 2006/0019146 A1 | 1/2006 | Yoshitake et al. |
| 2007/0248862 A1 | 10/2007 | Park et al. |

FOREIGN PATENT DOCUMENTS

| | | |
|---|---|---|
| JP | 2005078978 A | 3/2005 |
| JP | 2008021609 A | 1/2008 |

OTHER PUBLICATIONS

Machine translation of JP2005078978.
International Search Report and Written Opinion of Counterpart International Application No. PCT/US2009/002985.

*Primary Examiner* — Gregg Cantelmo
(74) *Attorney, Agent, or Firm* — Kinney & Lange, P.A.

(57) ABSTRACT

A catalyst structure for an electrochemical cell includes a catalyst support structure, catalyst particles and an outer carbide film. The catalyst particles are deposited on the catalyst support structure. The outer carbide film is formed on the catalyst support structure. The outer carbide film surrounds the catalyst particles.

13 Claims, 5 Drawing Sheets

CARBIDE STABILIZED CATALYST STRUCTURES AND METHOD OF MAKING

BACKGROUND

Electrodes containing supported metal catalyst particles are used in electrochemical cells, such as fuel cells. For example, in a conventional hydrogen fuel cell, a supported platinum catalyst is used to oxidize hydrogen gas into protons and electrons at the anode of the fuel cell. At the cathode of the fuel cell, another supported platinum catalyst triggers an oxygen reduction reaction (ORR), leading to the formation of water.

The catalyst support is typically a conductive high surface area carbon. The catalyst support provides a surface over which the catalyst particles are dispersed and stabilized. However, the carbon support may have poor interactions with the catalyst particles, which results in changes in the properties of the electrode. More specifically, poor catalyst-support interactions results in particle size growth of the catalyst particles under dissolution/redeposition processes. The increase in size of the catalyst particles through dissolution/redeposition causes a loss in fuel cell performance. The poor interactions between the carbon and the catalyst particles can even result in irreversible loss of the catalyst in the cathode.

Additionally, carbon catalyst supports in fuel cells are susceptible to corrosion that results in carbon oxidation and, as a final stage, collapse of the carbon pore structure. Causes of corrosion include the presence of oxygen, water, and high electrode potential, especially on the cathode side. Corrosion also causes microstructural derogation and surface chemistry changes, which can result in an irreversible loss in catalyst performance, cross-over and ultimately in the complete failure of the fuel cell. An improved catalyst support is needed so that the performance of an electrochemical cell can be maintained.

SUMMARY

A catalyst structure for an electrochemical cell includes a catalyst support structure, catalyst particles and an outer carbide film. The catalyst particles are deposited on the catalyst support structure. The outer carbide film is formed on the catalyst support structure. The outer carbide film surrounds the catalyst particles.

It is noted that the figures are not to scale.

DETAILED DESCRIPTION

A stabilized catalyst structure is described herein which includes catalyst particles stabilized on a carbon support by a carbide thin film. The stabilized catalyst structures can be used in fuel cells and other electrochemical devices. For example, the stabilized catalyst structures can form the basis for electrochemical cell catalyst layers.

Figure 1:
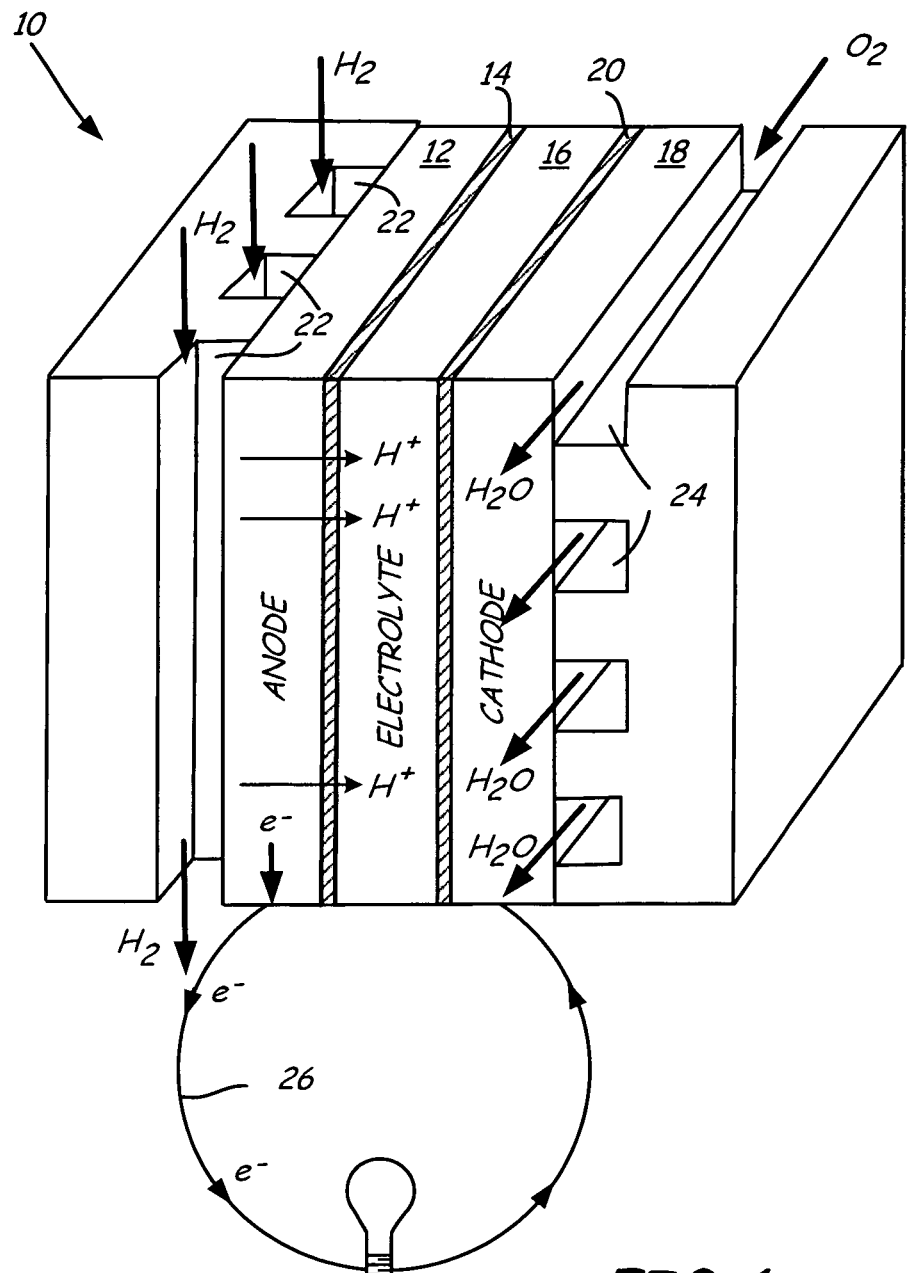
FIG. 1 is a schematic of a fuel cell that uses the catalyst structures described herein.

FIG. 1 is an example fuel cell 10, designed for generating electrical energy, that includes anode gas diffusion layer (GDL) 12, anode catalyst layer 14, electrolyte 16, cathode gas diffusion layer (GDL) 18, and cathode catalyst layer 20. Anode GDL 12 faces anode flow field 22 and cathode GDL 18 faces cathode flow field 24. In one example, fuel cell 10 is a fuel cell using hydrogen as fuel and oxygen as oxidant. It is recognized that other types of fuels and oxidants may be used in fuel cell 10.

Anode GDL 12 receives hydrogen gas ($H_2$) by way of anode flow field 22. Catalyst layer 14, which may be a platinum catalyst, causes the hydrogen molecules to split into protons ($H^+$) and electrons ($e^-$). While electrolyte 16 allows the protons to pass through to cathode 18, the electrons travel through an external circuit 26, resulting in a production of electrical power. Air or pure oxygen ($O_2$) is supplied to cathode 18 through cathode flow field 24. At cathode catalyst layer 20, oxygen molecules react with the protons from anode catalyst layer 14 to form water ($H_2O$), which then exits fuel cell 10, along with excess heat.

Catalyst particles dispersed and stabilized on catalyst support structures can form the basis of anode catalyst layer 14 and cathode catalyst layer 20. In one example, the catalyst particles are platinum. As described above, cathode catalyst layer 20 is used to increase the rate of the oxygen reduction reaction (ORR) ultimately resulting in the formation of water from protons, electrons and oxygen. Cathode catalyst layer 20 contains platinum as a catalyst but the platinum is unstable in this environment. During potential cycling, platinum atoms tend to dissolve and redeposit. This dissolution/redeposition process results in catalyst particle growth that decreases the performance of the fuel cell.

In one example, fuel cell 10 is a polymer electrolyte membrane (PEM) fuel cell, in which case electrolyte 16 is a proton exchange membrane formed from a solid polymer. In another example, fuel cell 10 is a phosphoric acid fuel cell, and electrolyte 16 is liquid phosphoric acid, which is typically held within a ceramic (electrically insulating) matrix.

Figure 2:
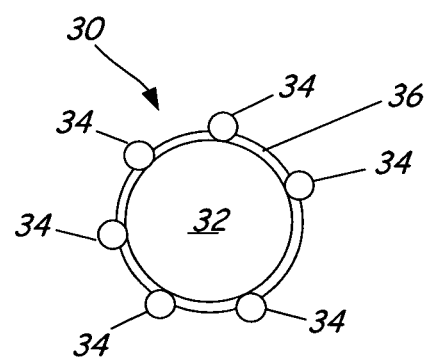
FIG. 2 is a cross-sectional view of a catalyst structure having a carbide thin film for use in the fuel cell of FIG. 1.

FIG. 2 is a cross-sectional view of stabilized catalyst structure 30 for use, for example, as a basis for anode catalyst layer 14 and cathode catalyst layer 20 in fuel cell 10. Catalyst structure 30 includes carbon support or core 32, catalyst particles 34 and outer carbide thin film 36. Carbon support 32 is any suitable carbon containing support. In one example, carbon support 32 is activated carbon or carbon black, such as Ketjen Black (KB). In another example, carbon support 32 includes mesoporous carbons, surface modified carbons (or modified carbons), carbon nanotubes, carbon nanowires, graphitized carbon, non-graphitized carbon and combinations thereof. Carbon support 32 is a catalyst support structure that supports catalyst particles 34.

Catalyst particles 34 can include any catalyst, such as platinum, gold, iridium, osmium, palladium, rhodium and ruthenium and mixtures and alloys thereof. Catalyst particles 34 can be a mixture of pure elements and/or alloys. Depositing a mixture of different elements and/or alloys can enhance the catalyst activity and stability of catalyst particles 34.

Catalyst particles 34 are nanoparticles. In one example, catalyst particles 34 have a diameter between about 0.2 nanometers (nm) and about 100 nm. In another example, catalyst particles 34 have a diameter between about 1 nm and about 100 nm. In a further example, catalyst particles 34 have a diameter between about 0.2 nm and about 20 nm. In a still further example, catalyst particles 34 have a diameter between about 0.2 nm and about 10 nm. In a still further example, catalyst particles 34 have a diameter between about 2 nm and about 10 nm.

Catalyst particles 34 are deposited on carbon support 32 using known deposition techniques to form supported catalyst particles. In one example, a chemical deposition process is used. In a specific example, the chemical deposition process includes dissolution of a platinum precursor and deposition of platinum particles by a reducing agent such as $H_2COH$, $H_4N_2$ or $NaBH_4$. Other catalyst particle synthesis and deposition techniques can be used, such as electrochemical deposition and thermo-decomposition techniques.

After catalyst particles 34 are deposited on the catalyst support structure of carbon support 32, outer carbide thin film 36 is formed on carbon support 32. Outer carbide thin film 36 preferentially forms on carbon support 32. Outer carbide thin film 36 primarily surrounds catalyst particles 34 and anchors catalyst particles 34 to carbon support 32. However, a small amount of outer carbide thin film 36 may form on catalyst particles 34. Formation of outer carbide thin film 36 on catalyst particles 34 is not preferable because it reduces the catalytic activity of catalyst particles 34, as described further below.

Outer carbide thin film 36 can include tungsten carbide, boron carbide, niobium carbide, molybdenum carbide, tantalum carbide, titanium carbide and combinations thereof. Outer carbide thin film 36 is an atomically thin layer. In one example, outer carbide thin film 36 has a thickness of between about 1 and 2 atomic layers. In another example, outer carbide thin film 36 has a thickness of less than about 1 nanometer. Outer carbide thin film 36 can be a homogeneous or heterogeneous layer. For example, outer carbide thin film 36 can have a uniform or non-uniform thickness. In one example, outer carbide thin film 36 can be thicker in selected locations compared to other locations. In another example, outer carbide thin film 36 can be small clusters so that a portion of the catalyst support structure may not be covered by outer carbide thin film 36.

Outer carbide thin film 36 stabilizes catalyst particles 34 on carbon support 32. As the diameter of catalyst particles 34 becomes smaller, particles 34 become more unstable on carbon support 32. For example, platinum nanoparticles having a diameter of about 2 nanometers or less are very unstable on carbon black. Such platinum nanoparticles are in motion on the carbon black due to the high surface energy, and quickly form agglomerates, which reduce the catalytic activity of the supported catalyst particles. Outer carbide thin film 36 physically anchors catalyst particles 34 on carbon support 32, and prevents or reduces movement of catalyst particles 34 on carbon support 32. Applying outer carbide thin film 36 after catalyst particles 34 are deposited on carbon support 32 stabilizes catalyst particles 34 and may allow catalyst particles 34 having diameters of about 2 nm or less to be used in fuel cell applications.

Outer carbide thin film 36 also protects carbon support 32 from corrosion. In a fuel cell environment, carbon support 32 is susceptible to corrosion due at least partially to the presence of oxygen, water and high electrode potential. This corrosion results in carbon oxidation and, as a final stage, collapse of carbon support 32. Corrosion causes microstructural derogation and surface chemistry changes, which can result in an irreversible loss in catalyst performance, and ultimately in the complete failure of the fuel cell. Outer carbide thin film 36 protects carbon support 32 and reduces or eliminates corrosion. Thus, outer carbide thin film 36 maintains the catalyst performance of the electrode.

Figure 3:
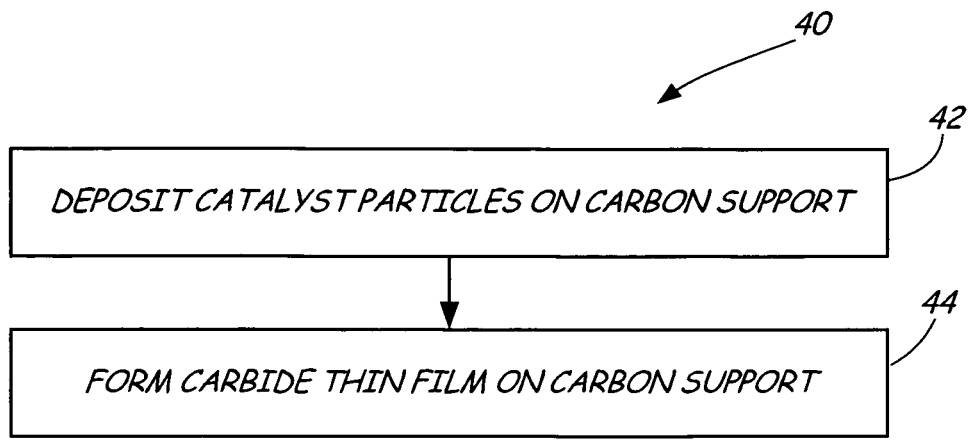
FIG. 3 is a block diagram illustrating a method for producing the stabilized catalyst structure of FIG. 2.

FIG. 3 is a block diagram of method 40 for forming stabilized catalyst structure 30 of FIG. 2. Method 40 includes the steps of depositing catalyst particles on a carbon support (step 42) and forming outer carbide thin film on the carbon support (step 44).

First, in step 42, catalyst particles are deposited on a catalyst support structure, such as a carbon support, to form supported catalyst particles. The catalyst particles can be deposited on the carbon support using any known deposition method. In one example, the catalyst particles are deposited using a chemical deposition method. In other examples, the catalyst particles can be deposited on the carbon support by a vapor deposition process, an electrochemical deposition process or a thermo-decomposition method. As described above, the carbon support can include carbon or modified carbon, and the catalyst nanoparticles can be selected from platinum, gold, iridium, osmium, palladium, rhodium and ruthenium and mixtures and alloys thereof. Alternatively, the carbon support can be acquired with catalyst particles already deposited thereon.

Next, in step 44, a carbide thin film is formed on the carbon support. Microwave irradiation (as will be described with respect to FIGS. 4A and 4B) is an example technique that can be used to form the carbide thin film. Other known techniques for forming carbide films, such as temperature programmed reaction (TPR), can be used. The desired carbide loading and the formula weight of the carbide compound deposited affect the thickness of the carbide thin film. Because the formula weights of carbide compounds are much greater than that of carbon, a small amount of a carbide thin film greatly affects the weight of catalyst structure 30. In fuel cells it may be desirable to have low carbide loading to maintain a low density catalyst structure. In one example, the carbide loading (the weight of carbide to the weight of carbon support) is not greater than 50%. In another example, the carbide loading is not greater than 30%.

Figure 4A:
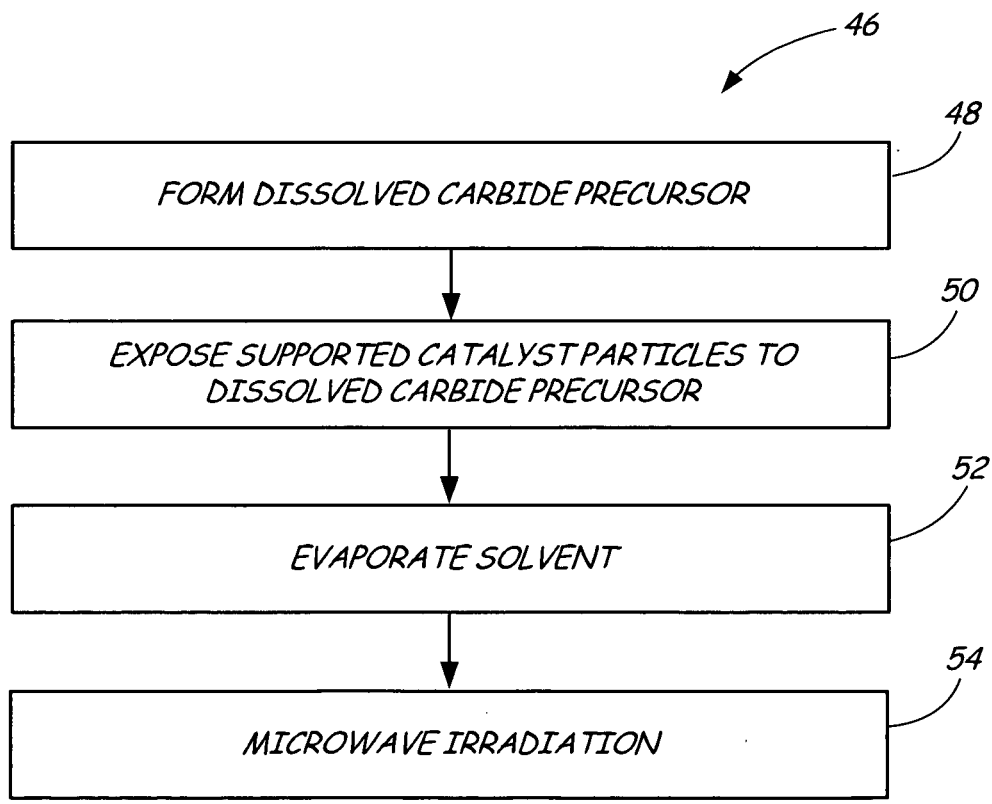
FIG. 4A is a block diagram illustrating a method for depositing a carbide thin film by microwave irradiation.

FIG. 4A is a block diagram of method 46 for forming a carbide thin film by microwave irradiation. Method 46 includes forming a dissolved carbide precursor solution (step 48), exposing the supported catalyst particles to a dissolved carbide precursor (step 50), evaporating the solvent (step 52) and microwave irradiating the carbon supports (step 54).

First, a dissolved carbide precursor solution is formed (step 48) by mixing a carbide precursor with a solvent. The carbide precursor can be a salt of any carbide precursor. Example carbide precursors include, but are not limited to, a tungsten salt, a boron salt, a niobium salt, a molybdenum salt, a tantalum salt, a titanium salt and combinations thereof. Further example carbide precursors include, but are not limited to, tungsten hexacarbonyl ($W(CO)_6$), ammonium tungstate ($(NH_4)_{10}H_2(W_2O_7)_6$ and sodium borate ($Na_2B_4O_7$). The carbide precursor can be a monophase or an alloy. The carbide precursor is dissolved into the solvent to form a carbide precursor solution. The solvent can be any solvent which dissolves the carbide precursor such as water or ethylene glycol.

The amount of carbide precursor dissolved in the solvent depends on the desired carbide loading. Because the weight of carbides, such as tungsten carbide, is much larger than that of carbon, depositing just a small amount of tungsten carbide on the carbon support significantly increases the weight of the carbon support. Additionally, in fuel cells, it is desirable to keep the density of the carbon supports and supported catalyst particles low. Therefore, a tradeoff must be made between the carbide loading and the density of the carbon supports. In one example, the carbide loading (defined as the ratio of the weight of carbide thin film to weight of carbon support) is about 50% or less, such as between about 5% and 50%. In another example, the carbide loading is about 30% or less, such as between about 5% and 30%.

Next, the supported catalyst particles are exposed to the dissolved carbide precursor in step 50. For example, the supported catalyst particles can be dropped into the dissolved carbide precursor solution or the carbide precursor solution can be poured over the supported catalyst particles. Other methods can also be used to expose the dissolved carbide precursor to the supported catalyst particles.

Next, the solvent is evaporated (step 52). The solvent can be evaporated by any conventional evaporation technique, such as heating. The solvent should be removed until the supported catalyst particles and carbon support are dry. After evaporating the solvent, a film of carbide precursor is formed on the carbon support. Use of a dissolved carbide precursor allows a homogenous coating of carbide precursor to form on the carbon support. In comparison, use of a solid carbide precursor can result in a non-homogenous or uneven coating.

Finally, the carbon support is subjected to microwave irradiation in step 54. Microwave irradiation increases the temperature of the carbon support, which causes the carbide precursor to react with the carbon support to form carbide compounds. The irradiation forms a carbide thin film on the carbon support. During microwave irradiation, the carbide precursor will preferentially form carbide compounds on the carbon support. The carbide thin film surrounds the catalyst particles and prevents or minimizes the movement of the catalyst particles on the carbon support.

The resulting carbide thin film is an atomically thin layer. For example, the carbide thin film can be between about 1 and 2 atomic layers thick. In another example, the carbide thin film is less than about 1 nm. The carbide thin film can be a homogenous or heterogenous layer. For example, the carbide thin film can have a uniform or non-uniform thickness. In another example, the outer carbide thin film can be small clusters so that a portion of the catalyst support may not be covered by the outer carbide thin film.

While the majority of the carbide thin film is formed on the carbon support and surrounds the catalyst particles, a small amount of carbide or carbon thin film may also be formed on the catalyst particles. Forming a carbide or carbon thin film on the catalyst particles will reduce the available surface area of the catalyst particles, and thus the catalyst activity of the catalyst particles. The system can be optimized to minimize the formation of carbide or carbon thin film on the catalyst particles by selecting carbide precursors that are more strongly attracted to the carbon support than to the catalyst particles.

Figure 4B:
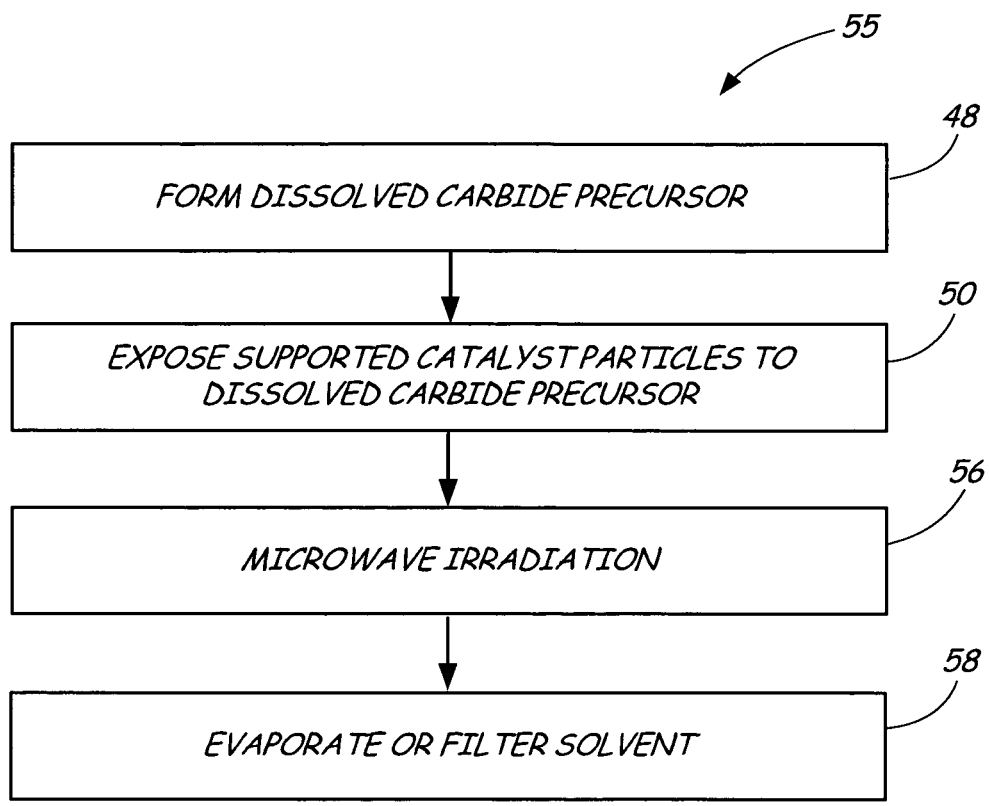
FIG. 4B is a block diagram illustrating an alternative method for depositing a carbide thin film by microwave irradiation.

An alternative microwave irradiation method 55 is shown in FIG. 4B. Method 55 is similar to method 46 except for the order of the last two steps. Method 55 includes forming a dissolved carbide precursor solution (step 48), exposing the supported catalyst particles to a dissolved carbide precursor (step 50), microwave irradiating the carbon supports (step 56) and evaporating or filtering the solvent (step 58). Steps 48 and 50 are the same as those described above with respect to FIG. 4A.

In step 56, the carbon support is subjected to microwave irradiation, which increases the temperature of the carbon support and causes the carbide precursor to react with the carbon support to form carbide. This forms a carbide thin film on the carbon support. During microwave irradiation, the carbide precursor will preferentially form a carbide thin film on the carbon support. The carbide thin film surrounds the catalyst particles and physically anchors the catalyst particles to the carbon support. The carbide thin film forms a stabilized catalyst structure and prevents or minimizes the movement of the catalyst particles on the carbon support.

After microwave irradiation, the solvent is evaporated or filtered in step 58. The solvent can be evaporated as described above with respect to step 52. Additionally or alternatively, the solvent can be removed by filtering. In the filtering process, the solvent and the stabilized catalyst structures are separated using filter paper. The solvent passes through the filter paper, leaving the stabilized catalyst particles on the filter paper.

Figure 5:
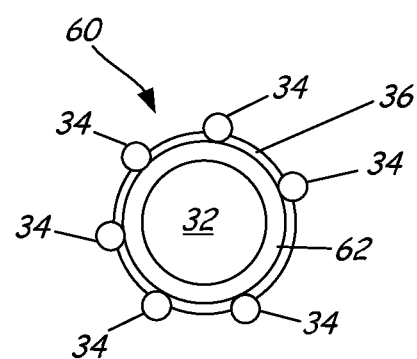
FIG. 5 is a cross-sectional view of an alternative catalyst structure having a carbide thin film.

FIG. 5 is a cross-sectional view of an alternative stabilized catalyst structure 60, which includes carbon support or core 32, inner carbide thin film 62, catalyst particles 34, and outer carbide thin film 36. Stabilized catalyst structure 60 is similar to stabilized catalyst structure 30 except catalyst structure 60 includes inner carbide thin film 62. Carbon support 32 can be any support containing carbon, such as activated carbon, carbon black, carbon nanowires, mesoporous carbons, surface modified carbons (or modified carbons), carbon nanotubes, graphitized carbon, non-graphitized carbon and combinations thereof.

Inner carbide thin film 62 is deposited on carbon support 32 to form a catalyst support structure. In one example, inner carbide thin film 62 contains tungsten carbide, boron carbide, niobium carbide, molybdenum carbide, tantalum carbide, titanium carbide or combinations thereof. Inner carbide thin film 62 is a homogenous or heterogeneous atomically thin layer. Inner carbide thin film 62 can have a uniform or non-uniform thickness. In one example, inner carbide thin film 62 has a uniform or non-uniform thickness between about 1 and 2 atomic layers thick. In another example, inner carbide thin film 62 is thicker than outer carbide thin film 36. In a further example, inner carbide thin film 62 can be small clusters so that a portion of the catalyst support may not be covered by carbide thin film 62.

Inner carbide thin film 62 can be formed by any known technique. In one example, inner carbide thin film 62 is formed by microwave irradiation, as described above with respect to FIG. 4A and FIG. 4B. In another example, inner carbide thin film 62 is formed by ball milling. Although microwave irradiation and ball milling are both room temperature processes for forming carbide thin films, other process can be used to form inner carbide thin film 62.

Catalyst particles 34 are deposited on the catalyst support structure formed by inner carbide thin film 62 and carbon support 32. As described above, catalyst particles 34 contain a catalyst such as platinum, gold, iridium, osmium, palladium, rhodium and ruthenium and alloys and combinations thereof. Catalyst particles 34 can be a mixture of different catalysts.

Catalyst particles 34 can be nanoparticles. In one example, catalyst particles 34 have a diameter between about 0.2 nm and about 100 nm. In another example, catalyst particles 34 have a diameter between about 1 nm and about 100 nm. In a further example, catalyst particles 34 have a diameter between about 0.2 nm and about 10 nm. In a still further example, catalyst particles 34 have a diameter between about 2 nm and about 10 nm.

Outer carbide thin film 36 is formed on carbon support 32 after catalyst particles 34 are deposited on the catalyst support structure. Outer carbide thin film 36 anchors catalyst particles 34 to the catalyst support structure formed by inner carbide thin film 62 and carbon support 32. Outer carbide thin film 36 prevents or reduces the movement of catalyst particles 34 on carbon support 32 and inner carbide thin film 62. Outer carbide thin film 36 further stabilizes catalyst particles 34. In one example, inner carbide thin film 62 contains tungsten carbide, boron carbide, niobium carbide, molybdenum carbide, tantalum carbide, titanium carbide or combinations thereof.

Outer carbide thin film 36 is an atomically thin layer having a uniform or non-uniform thickness. In one example, outer carbide thin film 36 is between about 1 and 2 atomic layers thick. In another example, outer carbide thin film 36 is less than about 1 nm thick. In a further example, carbide thin film 36 can be small clusters so that a portion of the catalyst support may not be covered by carbide thin film 36.

Outer carbide thin film 36 can be formed by any known technique, such as microwave irradiation, as described above with respect to FIGS. 4A and 4B. Outer carbide thin film 36 will preferentially form on inner carbide thin film 62, forming around catalyst particles 34. Although not preferable, a small amount of outer carbide thin film 36 may also form on catalyst particles 34. Depositing outer carbide thin film 36 is not preferable because outer carbide thin film 36 reduces the surface area and the catalytic activity of catalyst particles 34. The system can be optimized to reduce formation of outer carbide thin film 36 on catalyst particles 34 by selecting carbide precursors that are more strongly attracted to inner carbide thin film 62 than to catalyst particles 34.

The total carbide loading of catalyst structure 60 is defined as the ratio of the sum of the weight of carbide thin films 36 and 62 to the weight of carbon support 32. It is desirable to keep the density and the carbide loading of catalyst structure 60 low when catalyst structure 60 is used in fuel cells. In one example, the total carbide loading is about 50% or less, such as between about 5% and about 50%. In another example, the total carbide loading is about 30% or less, such as between about 5% and about 30%

Outer carbide thin film 36 and inner carbide thin film 62 of catalyst structure 60 stabilize catalyst particles 34. Catalyst particles on the nanoparticle scale, such as platinum nanoparticles, are unstable on carbon. For example, there is very little or no attraction between platinum nanoparticles and carbon. Thus, platinum nanoparticles migrate and agglomerate on a carbon support forming larger particles. This forms larger catalyst particles and decreases the catalyst activity of the supported catalyst particles due to the loss of active surface area.

Carbide thin films 36 and 62 prevent or reduce the migration of catalyst particles 34. Compared to inner carbide thin film 62, outer carbide thin film 36 greatly improves the stability of catalyst particles 34. Outer carbide thin film 36 anchors or fuses catalyst particles 34 to carbon support 32, increasing the stability of catalyst particles 34 and preventing or reducing agglomerations of catalyst particles 34. Outer carbide thin film 36 is a physical barrier that prevents movement of catalyst particles 34.

Further, carbide thin films 36 and 62 of catalyst structure 60 protect carbon support 32 from corrosion. As described above, carbon supports 32 are susceptible to corrosion that results in carbon oxidation and, as a final stage, collapse of carbon supports 32. Corrosion causes microstructural derogation and surface chemistry changes, which can result in an irreversible loss in catalyst performance. Carbide thin films 36 and 62 of catalyst structure 60 protect carbon support 32 from corrosion and maintain the catalyst performance of catalyst particles 34 and the electrode of which they are a part.

Inner carbide thin film 62 allows the formation of outer carbide thin film 34 that otherwise may not be possible. Depending on the method used to form outer carbide thin film 36, it may be necessary to form inner carbide thin film 62 on carbon support 32 before catalyst particles 34 are deposited. For example, platinum catalyst particles can act as a catalyst and prevent the formation of outer carbide thin film 34 when a vapor deposition method is used. In such a situation, inner carbide thin film 62 can be formed on carbon support 32 before catalyst particles 34 are deposited.

Although the present invention has been described with reference to preferred embodiments, workers skilled in the art will recognize that changes may be made in form and detail without departing from the spirit and scope of the invention.

The invention claimed is:

1. A catalyst structure for an electrochemical cell, the catalyst structure comprising:
   a catalyst support structure comprising:
      a core; and
      an inner carbide film on the core;
   catalyst particles deposited on the catalyst support structure; and
   an outer carbide film formed on the catalyst support structure and surrounding the catalyst particles to anchor the catalyst particles to the catalyst support structure, wherein the outer carbide film is preferentially formed on the catalyst support structure compared to the catalyst particles.

2. The catalyst structure of claim 1, wherein the catalyst support structure comprises carbon or modified carbon.

3. The catalyst structure of claim 1, wherein the catalyst particles are selected from the group consisting of platinum, gold, iridium, osmium, palladium, rhodium and ruthenium and alloys and combinations thereof.

4. The catalyst structure of claim 1, wherein the catalyst particles have a diameter between about 0.2 nanometers and about 100 nanometers.

5. The catalyst structure of claim 1, wherein the outer carbide film comprises at least one of tungsten carbide, boron carbide, niobium carbide, molybdenum carbide, tantalum carbide, titanium carbide and combinations thereof.

6. The catalyst structure of claim 1, wherein the outer carbide film has a uniform thickness of 1 atomic layer to 2 atomic layers.

7. The catalyst structure of claim 1, wherein the outer carbide film has a non-uniform thickness.

8. The catalyst structure of claim 1, wherein the outer carbide film is small clusters.

9. The catalyst structure of claim 1, wherein the inner carbide film has a uniform thickness of atomic layer to 2 atomic layers.

10. The catalyst structure of claim 1, wherein the inner carbide film has a non-uniform thickness.

11. The catalyst structure of claim 1, wherein the inner carbide film is thicker than the outer carbide film.

12. The catalyst structure of claim 1, wherein the inner carbide film comprises at least one of tungsten carbide, boron carbide, niobium carbide, molybdenum carbide, tantalum carbide, titanium carbide and combinations thereof.

13. The catalyst structure of claim 1, wherein a carbide loading is about 50% or less.

* * * * *